United States Patent [19]

Langsam

[11] Patent Number: 4,808,679
[45] Date of Patent: Feb. 28, 1989

[54] PROCESS FOR CONTROLLING THE MOLECULAR WEIGHT OF POLY(TRIALKYLSILYLPROPYNE) POLYMERS

[75] Inventor: Michael Langsam, Allentown, Pa.

[73] Assignee: Air Products and Chemicals, Inc., Allentown, Pa.

[21] Appl. No.: 145,854

[22] Filed: Jan. 19, 1988

[51] Int. Cl.$^4$ .......................... C08F 4/62; C08F 30/08
[52] U.S. Cl. ..................................... 526/126; 526/279; 526/285
[58] Field of Search ................ 526/126, 128, 279, 285

[56] References Cited

U.S. PATENT DOCUMENTS 4,567,245 1/1986 Takamizawa et al. ............ 526/279
4,657,564 4/1987 Songsam ............................ 55/16

FOREIGN PATENT DOCUMENTS 62-1706 1/1987 Japan .................................... 526/285
2135319 8/1984 United Kingdom .

OTHER PUBLICATIONS

Masuda et al., Macromolecules 1985, 18, 841-845.
T. Masuda et al., "Polymerization of 1-(trimethylsilyl)-1-Propyne by Halides of Niobium (V) and Tantalum (V) and Polymer Properties", Macromolecules 1985, 18, pp. 841-845.
T. Masuda et al., "Synthesis of High Polymers from Disubstituted Acetylenes Using Halides of Niobium (V) and Tantalum (V) as Catalysts", J. Chem. Soc., Chem. Commun., 1297-98 (1982).

*Primary Examiner*—Edward J. Smith
*Attorney, Agent, or Firm*—Mark L. Rodgers; William F. Marsh; James C. Simmons

[57] ABSTRACT

The present invention is a process for polymerizing trialkylsilylacetylene derived monomers to form the corresponding poly(trialkylsilylacetylene) polymer. The polymerization reaction is carried out in the presence of an organic solvent over a catalyst comprising a halide of a transition metal of group Vb or VIb. The molecular weight of the resultant polymer is decreased by adding to the reaction mixture, in a concentration between about 0.5-25 wt. %, a compound having the structural formula

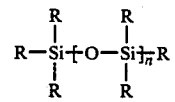

wherein each R is independently methyl, $C_{2-4}$ alkyl or phenyl, and n is from 1 to 100.

8 Claims, No Drawings

PROCESS FOR CONTROLLING THE MOLECULAR WEIGHT OF POLY(TRIALKYLSILYLPROPYNE) POLYMERS

TECHNICAL FIELD OF THE INVENTION

The present invention relates to the production of low molecular weight polymers in polymerization reactions of trialkylsilylacetylene derived monomers.

BACKGROUND OF THE INVENTION

Substituted silylacetylene polymers have been shown to exhibit desriable permeability and separation properties for various liquid and/or gas mixtures. Various methods have been disclosed for polymerizing various substituted silylacetylene monomers to form the corresponding polymers. U.K. Patent Application No. 2135319A discloses a polymer formed by polymerizing one or more 1-monoalkyl($C_{1-12}$)dimethylsilyl-propynes. The polymerization is carried out at a temperature range of 30° C.–100° C. for 12–36 hours, typically in the presence of an organic solvent used in an amount providing a monomer concentration of 0.1 to 5 mole/l. The reaction is catalyzed by one or more compounds, including halides, of transition metals of Group V of the Periodic Table, optionally in combination with one or more organo-aluminum compounds as co-catalyst. The catalyst concentration is 0.01–20 mole %, and preferably 0.5–5 mole %.

Toshio Masuda, et al. in an article entitled "Polymerization of 1-(trimethylsilyl)-1-propyne by Halides of Niobium (V) and Tantalum (V) and Polymer Properties", *Macromolecules* 1985, 18, 841, 845, teaches polymerizing 1-(trimethylsilyl)-1-propyne using catalysts comprising pentahalides of niobium and tantalum to give a high molecular weight polymer. The effects of solvents, temperature, and monomer and catalyst concentration on the resulting molecular weights of the polymers were studied. It was reported that the molecular weight, both weight and number average as measured by gel permeation chromatography for the resulting polymer, was typically high; e.g. up to $1 \times 10^6$.

Toshio Masuda, et al. "Synthesis of High Polymers from Disubstituted Acetylenes using Halides of Niobium (V) and Tantalum (V) as Catalysts" *J. Chem. Soc., Chem. Commun.*, 1297–98 (1982), teach polymerizing Oct-3-yne and 1-phenylprop-1-yne using halides of Nb and Ta, to product white soluble polymers whose weight-average molecular weights exceed one million.

Takamizawa, et al., U.S. Pat. No. 4,567,245 discloses a copolymer obtained by the copolymerization of 1-trimethylsilyl-1-propyne and 1-(1,1,3,3-tetramethyl-1,3-disilabutyl)-1-propyne in a molar ratio of 30:70 to 95:5 having a number-average molecular weight of at least $1 \times 10^4$. The copolymerization is carried out in an organic solvent in a temperature range from 30° C. to 130° C. in the presence of a polymerization catalyst such as $WCl_6$, $NbCl_5$, or $TaCl_5$.

Langsam, U.S. Pat. No. 4,657,564 discloses a membrane formed from a poly(trialkylsilylacetylene) polymer. The polymer is formed by conventional polymerization methods, such as by polymerizing the monomer units in an organic solvent using a catalyst such as $TaCl_5$, $MoCl_5$, $NbCl_5$, and the like.

BRIEF SUMMARY OF THE INVENTION

The present invention is an improved process for the polymerization of trialkylsilylacetylene derived monomers to form the corresponding poly(trialkylsilylacetylene) derived polymers. The polymerization reaction is carried out in the presence of an organic solvent over a catalyst comprising a halide of a transition metal of group Vb or VIb of the Periodic Table. The molecular weight of the resultant polymer can be controlled by adding to the reaction mixture, in a concentration of between about 0.5–25 wt. %, a compound having the structural formula:

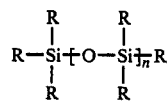

wherein each R is independently methyl, $C_{2-4}$ alkyl, or phenyl, and n is from 1 to 100.

This process produces lower molecular weight polymers for a given set of reaction conditions and catalyst, without significantly reducing the polymer yield or adversely affecting the critical gas permeability properties of the polymer. Lower molecular weight polymers are advantageous in that they are more easily dissolved in organic solvents and have lower solution viscosities allowing for easier handling in coating operations.

DETAILED DESCRIPTION OF THE INVENTION

Poly(trialkylsilylacetylene) derived polymers are prepared by the cationic polymerization of the parent monomers by a variety of group Vb or VIb metal halides. The molecular weight of the resultant polymer is typically very high, especially when reaction temperature and catalyst choice and concentration are selected to achieve high monomer to polymer conversion. It has now been found that the molecular weight of the resultant poly(trialkylsilylacetylene) derived polymer can be reduced for a given set of reaction conditions by adding to the reaction mixture, in a concentration of about 0.5–25 wt.%, a compound having the structural formula:

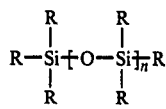

wherein each R is independently methyl, $C_{2-4}$ alkyl, or phenyl, and n is from 1 to 100.

Compounds having the above structure act as chain transfer agents in the polymerization reaction resulting in lower molecular weight polymers without significantly effecting the yield or the gas permeability properties of the resultant polymer. The chain transfer compound is added directly to the reaction mixture in a concentration of about 0.5–25 wt.%, and preferably 1 to 3 wt.% of the reactive mixture. Addition of the chain transfer compound to the reaction mixture is effective for reducing the polymer molecular weight for a wide variety of reaction conditions, including temperature, catalyst type and concentration, solvent choice, and monomer choice and concentration. While altering the reaction conditions above, such as temperature or catalyst level, can reduce the molecular weight of the polymer, it may also have a detrimental effect on polymer yield or permeability properties. Addition of a chain transfer compound having the above formula, by itself, does not produce such adverse effects on the reaction or resultant polymer, and is, therefore, an advantageous method for controlling molecular weight since it allows for lower molecular weight polymers to be produced at conditions which are optimum for polymer yield and properties.

In this type of polymerization reaction it is typical to determine the effect of variables on molecular weight by measuring the intrinsic[n] or Brookfield viscosities of the resultant reaction solutions since differences in solution viscosites for a given reaction mixture are directly correlated to differences in polymer molecular weights (i.e., both intrinsic and Brookfield viscosities increase as polymer molecular weight increases). Accordingly, for several of the examples below, differences in the viscosities of reaction solutions are measured to indicative variances in polymer molecular weight.

It is important that the compounds added to the reaction mixture have a structural formula as set out above, since other ethers, such as tetrahydrofuran, act as chain terminators and hinder the overall polymerization. Only the silyl ethers which have the above structure were found to lower the polymer molecular weight without hindering polymer formation.

Several operating examples of the present process were carried out and are described below. These examples are only meant to illustrate the present invention as are not meant to be limiting.

EXAMPLE 1

Several runs were carried out to demonstrate the effect of HMDS on the polymerization of trimethylsilylpropyne monomers to form poly(trimethylsilylpropyne). The runs were carried out in a batch phase reactor using toluene as an organic solvent and $TaCl_5$ catalyst. The reaction temperature was maintained at about 83° C. and pressure at about 25 psia. Various levels of HMDS were used for the runs, and a control run without HMDS was also carried out. Differences in polymer molecular weight were determined by measuring the intrinsic viscosity of the resultant solution. The results of these runs are reported in Table 1 below.

TABLE 1
EFFECT OF HMDS ON INTRINSIC VISCOSITY OF POLY(TRIMETHYLSILYLPROPYNE)

| Run No. | $TaCl_5$ (g) | Tp (°C.) | HMDS (Ml) | $\frac{HMDS}{TaCl_5}$ | $\frac{HMDS}{Monomer}$ ($\times 10^{+3}$) | Viscosity (dl/gr) |
|---|---|---|---|---|---|---|
| 1 | 0.48 | 83 | 0 | 0 | 0 | 5.60 |
| 2 | 0.48 | 83 | 0.15 | 0.56 | 5.5 | 5.00 |
| 3 | 0.48 | 83 | 0.22 | 0.80 | 8.1 | 4.75 |
| 4 | 0.48 | 83 | 0.40 | 1.44 | 14.6 | 4.25 |

The results reported above demonstrate that adding HMDS to the polymerization reaction can significantly reduce the intrinsic viscosity of the product solution. Additionally, it can be seen that the concentration of HMDS added to the reaction mixture was an important factor in determining the extent to which the intrinsic viscosity was reduced.

EXAMPLE 2

Several runs were carried out to determine the effects of HMDS on the viscosity of the reaction solution produced by the polymerization of trimethylsilylpropyne at various reaction temperatures and catalyst levels. Control runs (polymerization without HMDS) were also carried out at the various temperatures and catalyst levels to provide a direct comparison. Polymer yield, Brookfield and intrinsic viscosities, as well as gas permeabilities of the resultant polymers were measured for each of the runs and are reported, along with the reaction conditions, in Table 2 below.

TABLE 2

| Run No. | 1 | 2 | 3 | 4 | 5 | 6 | 7 | 8 | 9 | 10 |
|---|---|---|---|---|---|---|---|---|---|---|
| $TaCl_5^{(1)}$ | H | H | L | L | M | H | L | L | L | M |
| $Tp^{(2)}$ | L | H | L | H | M | L | H | L | H | M |
| HMDS (ml) | 0 | 0 | 0 | 0 | 0 | 0.15 | 0.15 | 0.15 | 0.15 | 0.15 |
| Yield (%) | 91.3 | 94.7 | 94.0 | 93.3 | 95.3 | 92.7 | 94.0 | 63.3 | 96.7 | 95.3 |
| BV (1.5%) | 808 | 140 | 1420 | 1000 | 660 | 61 | 46 | 1272 | 842 | 240 |
| [n] | 4.72 | 3.10 | 5.93 | 5.60 | 4.00 | 2.70 | 2.48 | 5.65 | 5.00 | 3.85 |
| P̄ | | | | | | | | | | |
| He | 6514 | 6029 | 5547 | 6148 | 6421 | 5674 | 6252 | 6047 | 6473 | 6559 |
| $O_2$ | 10394 | 9078 | 8288 | 9491 | 9638 | 7949 | 9500 | 9499 | 9626 | 10117 |
| $N_2$ | 7324 | 6436 | 6122 | 6755 | 7001 | 5552 | 6339 | 6679 | 6948 | 7094 |
| $CO_2$ | 37903 | 31772 | 28838 | 34500 | 31445 | 25908 | 32950 | 31336 | 33964 | 35296 |
| α | | | | | | | | | | |
| $O_2/N_2$ | 1.42 | 1.41 | 1.35 | 1.41 | 1.38 | 1.43 | 1.50 | 1.42 | 1.39 | 1.43 |

$^{(1)}TaCl_5$
$^{(2)}$polymerization temperature
H = 1.91 g
H = 83° C.
M = 1.19 g
M = 56° C.
L = 0.48 g
L = 25° C.

The above results clearly show that for each combination of temperature and catalyst level, the addition of HMDS as a chain transfer agent, reduces both the intrinsic and Brookfield viscosities of the product. Additionally, the permeability of various gases as well as the separation factor (α) for $O_2/N_2$ were not adversely affected by the addition of HMDS. For most of the runs, the addition of HMDS did not significantly reduce the polymer yield indicating that it acts as a chain transfer agent rather than a chain terminator.

EXAMPLE 3

Additional runs were carried out to determine the effect of HMDS level on both polymer yield and polymer molecular weight. Trimethylsilylpropyne monomers were polymerized in toluene at 25° C. in the presence of TaCl$_5$ catalyst (about 1% based on monomer). The intrinsic viscosity of the resultant polymer product was measured in toluene at 30° C., and the weight-average molecular weight was determined by gel permeating chromatography using a calibration curve for polystyrene. The results of these runs are reported in Table 3 below.

TABLE 3

| HMDS Level (weight %) | Yield (%) | [n] | MW (× 10$^3$) |
|---|---|---|---|
| 0.7 | 100 | 4.4 | 569 |
| 1.4 | 100 | 4.3 | 555 |
| 2.2 | 94 | 4.2 | 547 |
| 7.2 | 72 | 3.2 | 422 |
| 14.0 | 70 | 2.6 | 249 |

The above results show that, for the polymerization conditions recited above, the concentration of HMDS directly affects the molecular weight of the polymer product. Additionally, however, as the concentration of HMDS was increased, the polymer yield decreased, indicating that the level of chain transfer agent which is added to the reaction mixture can be calculated so as to optimize both product yield and product molecular weight for a given set of reaction conditions.

EXAMPLE 4

Experiments were performed to compare the effects of HMDS with the effects of tetrahydrofuran (THF) on the polymerization of trimethylsilylpropyne. The runs were carried out using toluene as a solvent over TaCl$_5$ catalyst. Various levels of both THF and HMDS were added to separate runs and compared with Control runs without any additives. The polymer yield and Brookfield viscosities of the resultant products were calculated and are reported in Table 4 below.

TABLE 4

| Run | 1 | 2 | 3 | 4 | 5 | 6 |
|---|---|---|---|---|---|---|
| TaCl$_5$ (gr.) | .8 | .8 | .8 | .8 | .8 | .8 |
| Toluene | 100 | 100 | 100 | 100 | 100 | 100 |
| THF (ml) | — | 0.1 | 0.2 | — | — | — |
| HMDS (ml) | — | — | — | — | .24 | .48 |
| TMSP | 15 | 15 | 15 | 10 | 10 | 10 |
| Yield (%) | 89.3 | 27.3 | 0 | 91 | 90 | 87.5 |
| BV | 6500 | 6150 | — | 2500 | 1000 | 1000 |

The data reported above clearly indicates that THF is not suitable for decreasing the polymer molecular weight in such reactions. The addition of THF even at low levels greatly reduced the product yield, i.e., no product was detected for the run using 0.2 ml of THF, and at levels where polymer was formed (0.1 ml) the Brookfield viscosity was not greatly affected. The addition of HMDS, however, produced a large reduction in Brookfield viscosity, without significantly reducing the product yield. This demonstrates that compounds have structures like HMDS (silyl ethers) are unique in their ability to control the polymer molecular weight for such reactions without adversely affecting the reaction itself or the properties of the resultant polymer.

Having thus described the present invention, what is now deemed appropriate for Letters Patent is set out in the following appended claims.

What is claimed is:

1. In a process for the polymerization of trialkylsilylacetylene derived monomers by forming a reaction mixture comprising said trialkylsilylacetylene derived monomers, an organic solvent and a catalyst comprising a halide of a transition metal of group Vb or VIb, the improvement for decreasing the molecular weight of the resultant polymer without significantly decreasing conversion which comprises:

adding to the reaction mixture, in a concentration of between about 0.5–25 wt.% based on the total reaction mixture, a compound having the structural formula:

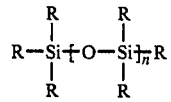

wherein each R is independently methyl, C$_{2-4}$ alkyl or phenyl, and n is from 1 to 100.

2. A process in accordance with claim 1 wherein the trialkylsilylacetylene monomers are trimethylsilylpropyne and the resultant polymer is poly(trimethylsilylpropyne).

3. A process in accordance with claim 1 wherein the compound added to the reaction mixture is hexamethyl disiloxane.

4. A process in accordance with claim 1 wherein said catalyst is a chloride or bromide of niobium, tantalum, molybdenum or tungsten.

5. A process in accordance with claim 1 wherein said polymerization is carried out at a temperature in the range of 25° C.–100° C.

6. A process in accordance with claim 1 wherein said organic solvent is present in an amount such that the monomer concentration is in the range of 0.1–5 mole/L.

7. A process in accordance with claim 1 wherein the polymerization results in a polymer/organic solvent mixture which has an intrinsic viscosity less than 5.0 at 30° C.

8. A process in accordance with claim 1 wherein the catalyst is present in a concentration range of 0.01–20 mole % based on the monomer.

* * * * *